United States Patent
Kinnear, Jr. et al.

(10) Patent No.: US 8,291,111 B1
(45) Date of Patent: Oct. 16, 2012

(54) RESPONDING TO A DHCPLEASEQUERY MESSAGE

(75) Inventors: Kenneth E. Kinnear, Jr., Boxborough, MA (US); Bernard Volz, Center Harbor, NH (US); Mickael Graham, Bellevue Hill (AU)

(73) Assignee: Cisco Technology, Inc., San Jose, CA (US)

( * ) Notice: Subject to any disclaimer, the term of this patent is extended or adjusted under 35 U.S.C. 154(b) by 1298 days.

(21) Appl. No.: 11/598,334

(22) Filed: Nov. 13, 2006

(51) Int. Cl.
*G06F 17/30* (2006.01)
*G06F 11/14* (2006.01)

(52) U.S. Cl. ........ 709/239; 709/225; 709/220; 709/218; 709/224; 370/392

(58) Field of Classification Search .................... 709/239
See application file for complete search history.

(56) References Cited

U.S. PATENT DOCUMENTS

| | | | |
|---|---|---|---|
| 5,978,373 A | 11/1999 | Hoff et al. | |
| 6,728,232 B2 | 4/2004 | Hasty, Jr. et al. | |
| 6,728,718 B2 * | 4/2004 | Banerjee et al. | 1/1 |
| 6,834,302 B1 * | 12/2004 | Harvell | 709/224 |
| 7,242,689 B2 | 7/2007 | Ikemura et al. | |
| 2004/0162899 A1 * | 8/2004 | Dommety | 709/225 |
| 2004/0261116 A1 * | 12/2004 | Mckeown et al. | 725/109 |
| 2005/0021766 A1 * | 1/2005 | McKeowen et al. | 709/228 |
| 2005/0027851 A1 * | 2/2005 | McKeown et al. | 709/224 |

* cited by examiner

*Primary Examiner* — Asad M Nawaz
*Assistant Examiner* — Jason Harley
(74) *Attorney, Agent, or Firm* — BainwoodHuang

(57) ABSTRACT

A technique is performed in a first device of a set of devices. The technique involves receiving a query message from a network node, the query message requesting data regarding a network resource. The technique further involves accessing an identifier which indicates whether the first device is in charge of the network resource, and providing a response message to the network node in response to the query message. The response message is provided after waiting a predefined amount of time when the identifier indicates that the first device is not in charge of the network resource and there is reason to believe another device of the set is operating. The response message is provided without waiting the predefined amount of time when the identifier indicates that the first device is in charge of the network resource. Moreover in some situations, the first device may choose to not respond.

19 Claims, 4 Drawing Sheets

RESPONDING TO A DHCPLEASEQUERY MESSAGE

BACKGROUND

The Dynamic Host Configuration Protocol (DHCP) enables a DHCP server to assign an Internet Protocol (IP) network address to a DHCP client. A description of DHCP is provided in a publication entitled "RFC 2131—Dynamic Host Configuration Protocol" by R. Droms, Bucknell University, dated March 1997, the teachings of which are hereby incorporated by reference in their entirety. Additionally, a description of how two DHCP servers achieve synchronization for high availability DHCP service is provided in a publication entitled "DHCP Failover Protocol" by Droms et al., Proceedings of the Fifty-Sixth Internet Engineering Task Force, dated March 2003, the teachings of which are hereby incorporated by reference in their entirety.

In some situations, DHCP Relay Agents are useful for conveying DHCP messages between DHCP clients and DHCP servers (e.g., across subnets). During DHCP message exchanges, the DHCP Relay Agents are capable of sending additional information to the DHCP servers. A detailed description of the Relay Agent Information Option is provided in a publication entitled "RFC 3046—DHCP Relay Agent Information Option" by M. Patrick, dated January 2001, the teachings of which are hereby incorporated by reference in their entirety.

If DHCP version 4 (DHCPv4) Relay Agents lose their state information about ongoing DHCPv4 conversations (e.g., due to temporary power failure, software outages, etc.), the DHCPv4 Relay Agents can issue DHCPLEASEQUERY messages to the DHCP servers in attempts to recover their state information. The DHCP servers respond as quickly as possible to the DHCPLEASEQUERY messages with responses (e.g., DHCPLEASEACTIVE, DHCPLEASEUNKNOWN or DHCPLEASEUNASSIGNED messages) to enable the DHCP Relay Agents to determine the status, IP endpoint locations and remaining durations of IP network address leases. Once a DHCP Relay Agent receives a response to a particular DHCP leasequery, the DHCP Relay Agent updates its state information so that it can resume providing service. A detailed description of DHCPLEASEQUERY messages is provided in a publication entitled "RFC 4388—Dynamic Host Configuration Protocol (DHCP) Leasequery" by R. Woundy and K. Kinnear, dated February 2006, the teachings of which are hereby incorporated by reference in their entirety.

BRIEF DESCRIPTION OF THE DRAWINGS

The foregoing and other objects, features and advantages of various embodiments will be apparent from the following description and illustrations in the accompanying drawings in which like reference characters refer to the same parts throughout the different views. The drawings are not necessarily to scale, emphasis instead being placed upon illustrating certain principles of the various embodiments.

DETAILED DESCRIPTION

Overview

Figure 1:
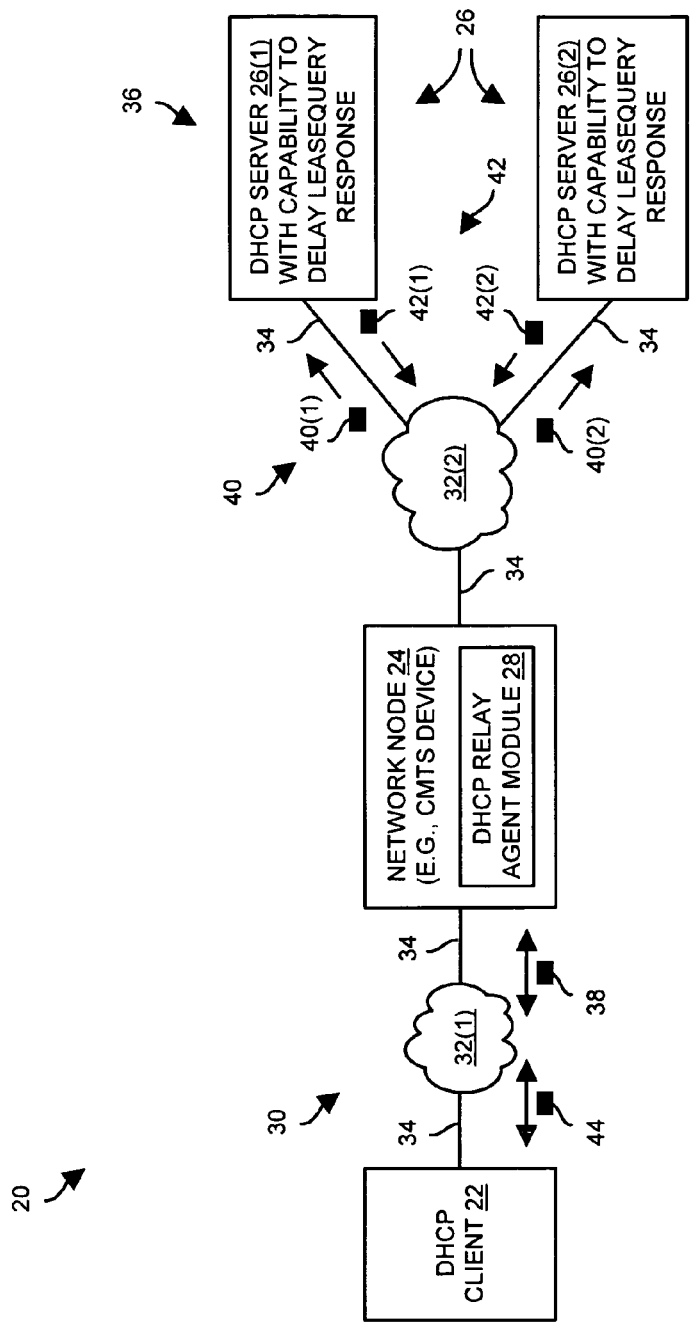
FIG. 1 is a block diagram of a system configured to handle a DHCPLEASEQUERY message in an improved manner.

Unfortunately, there are deficiencies with the above-described conventional approach to handling DHCPLEASEQUERY messages. For example, when a DHCP Relay Agent loses its state information about ongoing DHCPv4 conversations (e.g., due to a temporary power failure), the DHCP Relay Agent typically sends out DHCPLEASEQUERY messages to DHCP servers to recover its state. In particular, the DHCP Relay Agent typically requests such state information in a reactive manner such as in response to receiving a message from or destined for a DHCPv4 client. When the DHCP Relay Agent receives a message from or for an address that it has no information about after losing its state information, the DHCP Relay Agent sends DHCPLEASEQUERY messages to all of the DHCP servers that it believes will have pertinent state information. In the context of a DHCP cooperating pair, the DHCP Relay Agent sends DHCPLEASEQUERY messages to both DHCP servers of the pair in case one of the DHCP servers is down. The DHCP servers then respond to the DHCPLEASEQUERY messages as quickly as possible with lease information from their respective databases. In this situation, the possibility exists that the DHCP Relay Agent receives two different answers if one of the DHCP servers recently interacted with a DHCP client regarding a lease but has not yet updated the other DHCP server (e.g., data from the main DHCP server may not have propagated to the backup DHCP server). The DHCP Relay Agent will take the wrong answer if the DHCP Relay Agent receives a response from the non-updated DHCP server first since DHCP Relay Agents typically take the first answer they receive regardless of which DHCP server sent the answer. If this happens, the DHCP Relay Agent will accept incorrect or stale information and then not allow service to the DHCPv4 client.

One possible solution to this drawback is for technicians to program DHCP Relay Agents with specialized code to identify the right answer among different answers from multiple DHCP servers regardless of which answer is received first. Unfortunately, the complexity of identifying the correct answer makes this solution difficult to design and implement. For instance, when there is a lack of response from a cooperating DHCP server, there is no ideal amount of time for a DHCP Relay Agent to wait, and no ideal number of times a DHCP Relay Agent should retry. Furthermore, this solution would be burdensome to incorporate into each legacy DHCP Relay Agent device.

In contrast to the above-described conventional DHCP servers which respond as quickly as possible to DHCPLEASEQUERY messages, an improved technique involves delaying a response to a DHCPLEASEQUERY message under certain circumstances, or not responding at all under certain other circumstances. For example, suppose that there are two DHCP servers configured as a DCHP cooperating pair with a first DHCP server of the cooperating pair being the last DHCP server to exercise control over a particular network address lease, i.e., the first DHCP server is the cooperating partner that last interacted with a DHCP client regarding the lease. Furthermore, suppose that a DHCP Relay Agent sends out DHCPLEASEQUERY messages to the two DHCP servers of the cooperating pair. Here, the second DHCP server of the cooperating pair can be configured to wait a predefined amount of time before providing its leasequery response. As a result, if both DHCP servers are up and respond, the DHCP Relay Agent will receive the response from the first DHCP server ahead of the response from the second DHCP server. If the DHCP Relay Agent is configured to rely on the state information of the first received response, the DHCP Relay Agent will update its state information based on the answer from the DHCP server which last exercised control over the lease regardless of the accuracy of the answer from the second DHCP server. Thus, correct DHCP Relay Agent operation is achieved and no modifications need to be made to legacy DHCP Relay Agents.

One embodiment is directed to a technique performed in a first device of a set of devices (e.g., a DHCP cooperating pair). The technique involves receiving a query message from a network node, the query message requesting data regarding a network resource (e.g., a DHCPLEASEQUERY message regarding a lease of a particular IP network address to a DHCP client). The technique further involves accessing an identifier which indicates whether the first device is in charge of the network resource (i.e., whether the first device was the last device of the set of devices to exercise control over the network resource), and providing a response message to the network node in response to the query message. The response message is provided after waiting a predefined amount of time when the identifier indicates that the first device is not in charge of the network resource (i.e., when the first device was not the last device of the set of devices to exercise control over the network resource). The response message is provided without waiting the predefined amount of time when the identifier indicates that the first device is in charge of the network resource (i.e., when the first device was the last device of the set of devices to exercise control over the network resource). And, in some circumstances (i.e., when the network resource is in a certain state), no response message is provided.

Description of Example Embodiments

FIG. 1 shows a system 20 which is configured to handle a DHCPLEASEQUERY message in an improved manner. The system 20 includes a DHCP client 22, a network node 24, and DHCP servers 26(1), 26(2) (collectively, DHCP servers 26). The network node 24 runs a DHCP Relay Agent module 28 which operates in accordance with DHCPv4 as defined by the Internet Engineering Task Force (IETF).

As further shown in FIG. 1, the DHCP client 22, the network node 24 and the DHCP servers 26 as well as one or more other devices are configured to communicate with each other through a communications fabric 30 (e.g., copper wire, fiber optic cable, wireless medium, related data communications devices, combinations thereof, etc.) which is shown generally by network clouds 32(1), 32(2) and connecting lines 34. It should be understood that other components (e.g., other client and server devices, other network nodes, firewalls, routers, switches, bridges, gateways, etc.) can be considered to belong to the system 20 as well.

By way of example, the network node 22 is a Cable Modem Termination System (CMTS) device configured to exchange signals with cable modems. In this example, the DHCP Relay Agent module 28 runs within the CMTS device as the CMTS performs CMTS-related operations.

During operation of the system 20, the DHCP servers 26 are configured to operate as a DHCP cooperating pair 36. The DHCP client 22 exchanges DHCP messages 38 through the DHCP Relay Agent 28 to dynamically obtain and use an IP network address from the DHCP cooperating pair 36. Additionally, if the DHCP Relay Agent 28 ever loses the state of the address lease, the DHCP Relay Agent 28 is configured to send DHCPLEASEQUERY messages 40(1), 40(2) (collectively, DHCPLEASEQUERY messages 40) to the DHCP servers 26(1), 26(2) to re-obtain the state of that address lease. In response to the DHCPLEASEQUERY messages 40, the DHCP servers 26(1), 26(2) provide DHCP response messages 42(1), 42(2) (collectively, DHCP response messages 42) with information from their databases back to the DHCP Relay Agent 28.

As will be explained shortly, each DHCP server 26 is configured to delay a DHCP response message 42 back to the DHCP Relay Agent 28 if that DHCP server 26 is not the most recent DHCP server 26 to interact with the DHCP client 22 regarding that address lease (i.e., if that DHCP server 26 is not in charge of the lease for that address). Accordingly, the DHCP server 26 that last interacted with the DHCP client 22 regarding that address is the first DHCP server device to provide a DHCP response message 42 to the DHCP Relay Agent 28. As a result, the DHCP Relay Agent 28 will receive the most authoritative state information in the first leasequery answer received (i.e., the non-delayed DHCP response message 42) rather than potentially incorrect information which could otherwise deprive service to the DHCP client 22. With the client 22 enjoying robust and reliable DHCP service, the client 22 is then able to competently communicate with other devices using an IP network address, e.g., see the messages 44 in FIG. 1. Further details will now be provided with reference to FIG. 2.

Figure 2:
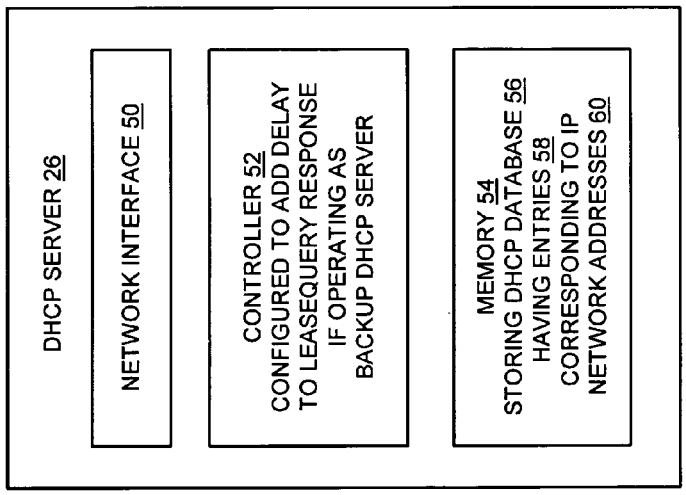
FIG. 2 is a block diagram of a DHCP server of the system of FIG. 1.

FIG. 2 shows particular details of each DHCP server 26 of the DHCP cooperating pair 36 of FIG. 1. The DHCP server 26 includes a network interface 50, a controller 52, and memory 54. The network interface 50 provides connectivity to the network fabric 30. The controller 52 directs operation of the DHCP server 26. The memory 54 stores a DHCP database 56 having entries 58 corresponding to IP network addresses 60 (i.e., a pool of IP addresses) which are either leased or capable of being leased by the controller 52 to DHCP clients such as the DHCP client 22 of FIG. 1.

During operation, the DHCP server 26 is capable of exchanging DHCP messages 38 with the DHCP client 22, and other DHCP messages 40, 42 with the DHCP Relay Agent 28 (FIG. 1). For example, to dynamically assign a particular IP network address 60 to the DHCP client 22, the DHCP server 26 exchanges particular DHCP messages 38 (e.g., DHCP-DISCOVER, DHCPREQUEST, DHCPOFFER, DHCPACK, etc.) with the DHCP client 22 through the DHCP Relay Agent 28. As part of this process, the controller 52 communicates with the DHCP client 22 through the network interface 50, and accesses the DHCP database 56 in the memory 54. To record assignment of the particular IP network address 60 to the DHCP client 22, the controller 52 updates a database entry 58 corresponding to the particular IP network address 60. Specifically, the controller 52 modifies the database entry 58 to indicate that (i) the IP network address 60 is now leased to the DHCP client 22 (e.g., for a predetermined lease period) and (ii) the DHCP server 26 is in charge of the IP network address 60 since the DHCP server 26 is the last cooperating partner of the DHCP cooperating pair 36 to interact with the DHCP client 22.

Additionally, the controller 52 sends a DHCP failover update message to the other DHCP server 26 of the DHCP cooperating pair 36 to make the other DHCP server 26 aware of the address assignment to the DHCP client 22. Since DHCP servers typically send out DHCP failover update messages to cooperating partners only when enough updates have accumulated to complete a DHCP failover update message or periodically (e.g., once a minute), it may take a while before the other DHCP server 26 receives notification of the lease to the DHCP client 22 (e.g., up to a minute). Until the other DHCP server 26 receives this update, the DHCP databases 58 of the DHCP servers 26 are not in synch with respect to the state information of the particular IP network address 60, i.e., the particular IP network address state information in the DHCP server 26 which did not last interact with the DHCP client 22 is inaccurate until that DHCP server 26 receives the update.

It should be understood that the DHCP client 22 is capable of carrying out further communications with the DHCP cooperating pair 36 to renew its lease for the particular IP network address 60. As part of the lease renewal process, the controller 52 of the DHCP server 26 (FIG. 2) updates the entry 58 in the DHCP database 56 corresponding to the IP network address 60 to indicate that (i) the lease for the IP network address 60 is now renewed to the DHCP client 22 (e.g., for a new lease period) and (ii) the DHCP server 26 was again the last DHCP server 26 to interact with the DHCP client 22. Furthermore, the controller 52 sends another DHCP failover update message to its cooperating partner to make the cooperating partner aware of the lease renewal. Upon receipt of that DHCP failover update message, the cooperating partner marks its database 56 to indicate that the lease for the IP network address 60 has been renewed. It should be understood that the cooperating partner is not in charge of the address lease since it is merely processing a DHCP failover update message regarding the lease from the other DHCP server 26.

At any time during operation of the system 20, the DHCP servers 26 of the DHCP cooperating pair 36 may receive a DHCPLEASEQUERY message 40 from the DHCP Relay Agent 28. For example, if the network node 24 temporarily loses power or suffers a software reset, the DHCP Relay Agent 28 can lose the state information it has regarding an IP address lease. Upon receipt of a message from a DHCP client 22 for which there is no state information (e.g., see reference numeral 44 in FIG. 1 which illustrates a non-DHCP message), the DHCP Relay Agent 28 attempts to recover the lost state information in order to continue to provide service to the DHCP client 22. Accordingly, the DHCP Relay Agent 28 sends a DHCPLEASEQUERY message 40 to each DHCP server 26.

When a DHCP server 26 receives a DHCPLEASEQUERY message 40 from the DHCP Relay Agent 28, the DHCP server 26 determines whether it is in charge of the particular IP network address 60. In particular, the controller 52 accesses the entry 58 for the particular IP network address 60 from its local DHCP database 56 to see whether the DHCP server 26 was the last DHCP server 26 to interact with the DHCP client 22 regarding the particular IP network address 60. If so, the controller 52 immediately generates and provides a DHCP response message 42. However, if the DHCP server 26 was not the last DHCP server 26 to interact with the DHCP client 22, the controller 52 waits a predefined amount of time (e.g., 500 milliseconds) and then generates and provides a DHCP response message 42 to the DHCP Relay Agent 28. Accordingly, the DHCP Relay Agent 28 will first receive a DHCP response message 42 from the DHCP server 26 which was the last DHCP server 26 to interact with the DHCP client 22 and thus obtain authoritative state information regarding the lease of the particular IP network address 60. Further details will now be provided with reference to FIG. 3.

Figure 3:
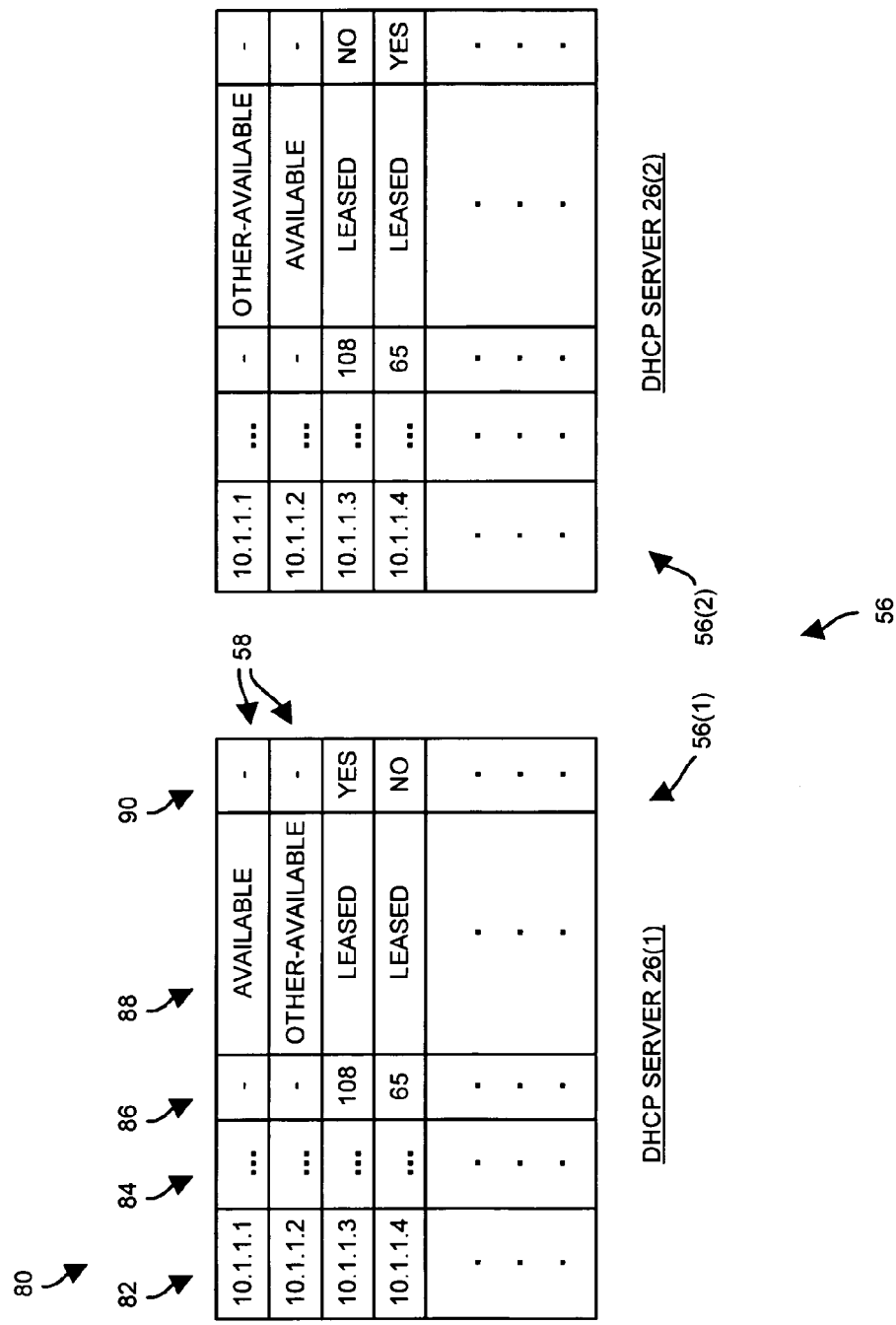
FIG. 3 is a block diagram view of DHCP databases of the DHCP servers of FIG. 1.

FIG. 3 shows an example set of DHCP databases 56 which are stored in the respective memories 54 of each DHCP server 26 of the DHCP cooperating pair 36 of FIG. 1. As shown in FIG. 3, the memory 54 of the DHCP server 26(1) stores a DHCP database 56(1). Similarly, the memory 54 of the DHCP server 26(2) stores a DHCP database 56(2). Each DHCP database 56 includes a set of entries 58 (shown as rows of a table). Each entry 58 includes an IP network address field 82 for holding an IP network address 60, a client ID field 84 for holding a DHCP client identifier (e.g., a MAC address of a DHCP client), a duration field 86 for holding a lease duration value, a status field 88 for holding status (e.g., AVAILABLE, OTHER-AVAILABLE, LEASED, etc.), and a control field 90 for holding a identifier value indicating whether the DHCP server 26 to which the database 56 belongs was the last to interact with the DHCP client 22 or whether the DHCP client 22 simply took an IP address update from the other DHCP server 26. Each entry 58 may include other fields as well.

By way of example only, as indicated by the third and fourth row entries 58 of each database 56, the IP network addresses "10.1.1.3" and "10.1.1.4" are leased to DHCP clients identified by the contents of the client ID fields 84 in those entries 58. As indicated by identifiers in the control field 90 of the "10.1.1.3" entry 58 in each database 56 (i.e., "YES" for the DHCP server 26(1) and "NO" for the DHCP server 26(2)), the DHCP server 26(1) was the last cooperating partner to interact with the DHCP client assigned with the "10.1.1.3" IP network address. Similarly, as indicated by the contents of the control field 90 of the "10.1.1.4" entry 58 in each database 56 (i.e., "NO" for the DHCP server 26(1) and "YES" for the DHCP server 26(2)), the DHCP server 26(2) was the last cooperating partner to interact with the DHCP client assigned with the "10.1.1.3" IP network address.

Now, suppose that the DHCP client 22 (FIG. 1) was assigned "10.1.1.3" as its IP network address. As shown by the databases 56 in FIG. 3, the DHCP server 26(1) is in charge of that IP network address since the databases 56 indicate that the DHCP server 26(1) was the last interact with the DHCP client 22 regarding the IP network address (i.e., the contents of the control field 90 for the "10.1.1.3" entry in the database 56(1) is "YES"). Further, suppose that the DHCP Relay Agent 28 (FIG. 1) sends a DHCPLEASEQUERY message 40 to each DHCP server 26 requesting state information for the DHCP client 22. As long as each DHCP server 26 believes that the other DHCP server 26 is up and running (e.g., due to periodic communications with the other DHCP server 26), the DHCP server 26(2) is configured to wait a predefined amount of time (e.g., 500 milliseconds) and then provide out a response (i.e., a DHCPLEASEACTIVE message) to the DHCP Relay Agent 28 because it is the cooperating partner that is not in charge of the "10.1.1.3" IP network address. In contrast, the DHCP server 26(1) is configured to provide a response (i.e., a DHCPLEASEACTIVE message) to the DHCP Relay Agent 28 without waiting because it is the cooperating partner in charge of the "10.1.1.3" IP network address. Accordingly, the DHCP Relay Agent 28 receives the state information from the DHCP server 26(1) first. As a result, even if the "10.1.1.3" database entry 58 of the DHCP server 26(2) is not updated and thus inaccurate, the DHCP Relay Agent 28 is able to operate based on authoritative information from the DHCP server 26(1) since the DHCP Relay Agent 28 first receives the non-delayed response from the DHCP server 26(1).

It should be understood that the delay inserted by the DHCP server 26(2) before sending its response is unnecessary if the DHCP server 26(2) knows that the DHCP server 26(1) has failed. For example, suppose that the DHCP server 26(2) concludes that the DHCP server 26(1) is not in a COMMUNICATION-UP state. Rather, the DHCP server 26(2) concludes that the DHCP server 26(1) is in a COMMUNICATION-DOWN state because the DHCP server 26(2) has failed to receive any communication from the DHCP server 26(1) within a particular timeout period. In this situation, if the DHCP server 26(2) receives a DHCPLEASEQUERY message 40 from the DHCP Relay Agent 28, the DHCP server 26(2) is configured to provide a DHCP response message 42 without purposefully waiting the predefined amount of time.

It should be further understood that the databases 56 are capable of including entries 58 for non-leased IP network addresses as well. For example, the first and second row entries 58 of the databases 56 in FIG. 3 show that an IP network address "10.1.1.1" is available for assignment by the DHCP server 26(1) (listed as "AVAILABLE" in the database 56(1)), and another IP network address "10.1.1.2" is available for assignment by the DHCP server 26(2). If a DHCP server 26 receives a DHCPLEASEQUERY message 40 for an IP network address which is locally listed as "OTHER-AVAILABLE" and if that DHCP server 26 is communicating with its partner, that DHCP server 26 drops the DHCPLEASEQUERY message 40 (i.e., does not send a DHCPLEASEUNASSIGNED response) since the partner controls the IP network address and should respond. Further details will now be provided with reference to FIG. 4.

Figure 4:
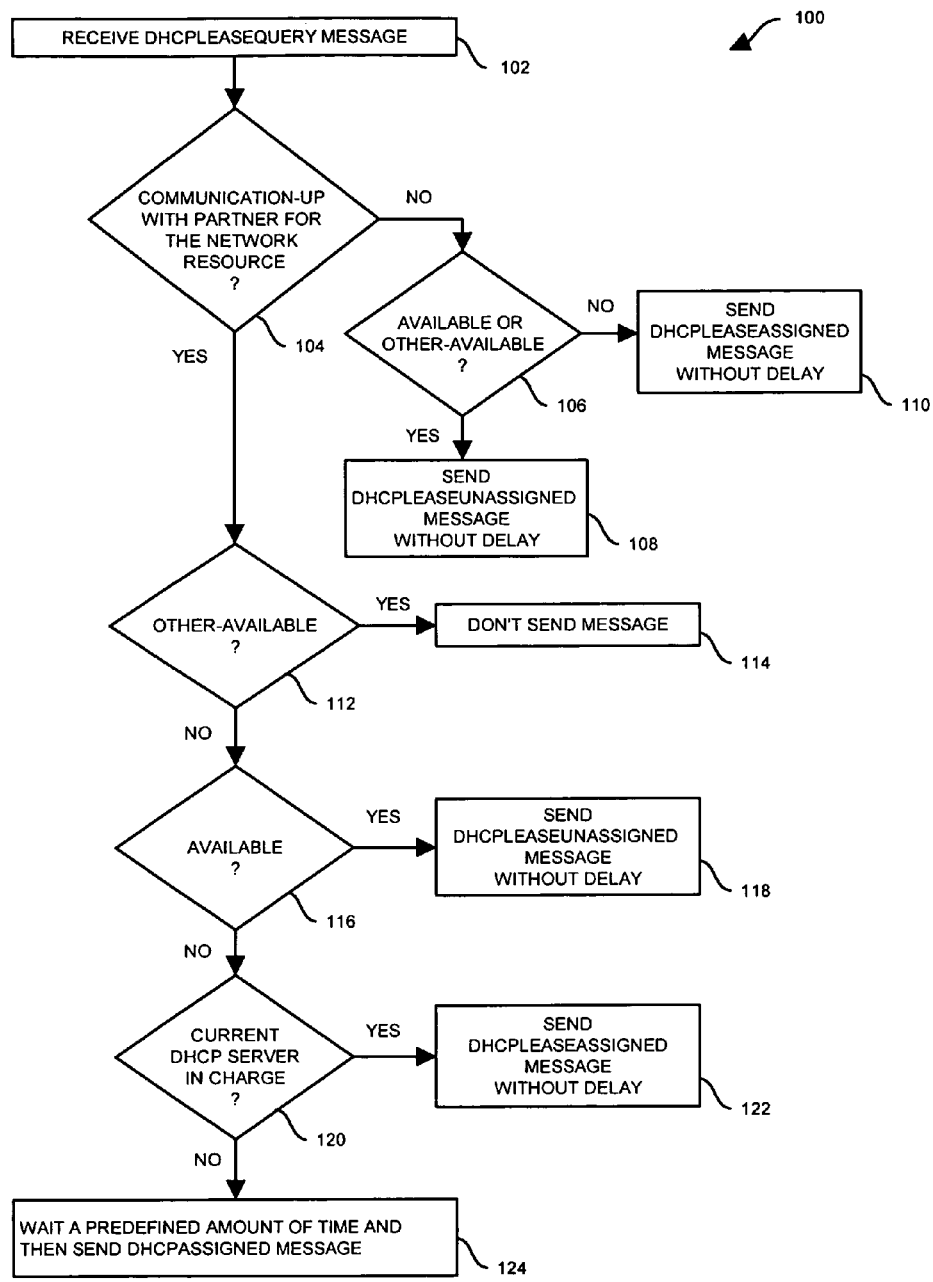
FIG. 4 is a flowchart of a procedure which is performed by a DHCP server of FIG. 1.

FIG. 4 is a flowchart of a procedure 100 which is performed by each DHCP server 26 of the DHCP cooperating pair 36 (also see FIG. 1). In step 102, the current DHCP server 26 receives a DHCPLEASEQUERY message 40 from a DHCP Relay Agent 28 (also see the network node 24 in FIG. 1). The DHCPLEASEQUERY message 40 requests data regarding a particular IP network address 60.

In step 104, the current DHCP server 26 accesses its database 56 to determine whether it should respond to the DHCPLEASEQUERY message 40. If the current DHCP server 26 does not have a COMMUNICATION-UP state with its cooperating partner for particular IP network address 60 (i.e., if the current DHCP server 26 has the COMMUNICATION-DOWN state with its cooperating partner), the current DHCP server 26 proceeds to step 106.

In step 106, if the status of the particular IP network address 60 is AVAILABLE or OTHER-AVAILABLE, the current DHCP server 26 proceeds to step 108. Otherwise, the current DHCP server 26 proceeds to step 110. Recall that the database entry 58, which corresponds to the particular IP network address 60, stores the status of the particular IP network address 60 in the status field 88 (FIG. 3).

In step 108, the current DHCP server 26 sends a DHCPLEASEUNASSIGNED message out in response to the DHCPLEASEQUERY message 40. The current DHCP server 26 does not wait the predefined amount of time.

In step 110, the current DHCP server 26 sends a DHCPLEASEASSIGNED message out in response to the DHCPLEASEQUERY message 40. The current DHCP server 26 does not wait the predefined amount of time.

With reference back to step 104, if the current DHCP server 26 has a COMMUNICATION-UP state with its cooperating partner for the particular IP network address 60, the current DHCP server 26 proceeds to step 112.

In step 112, if the particular IP network address 60 is OTHER-AVAILABLE, the current DHCP server 26 proceeds to step 114. Otherwise, the current DHCP server 26 proceeds to step 116.

In step 114, the current DHCP server 26 does not send any message back to the DHCP Relay Agent 28 in response to the DHCPLEASEQUERY message 40. Since the current DHCP server 26 is in communication with the cooperating partner for the particular IP network address 60, the current DHCP server 26 knows that the cooperating partner will provide a response to the DHCP Relay Agent 28.

In step 116, if the particular IP network address 60 is AVAILABLE, the current DHCP server 26 proceeds to step 118. Otherwise, the current DHCP server 26 proceeds to step 120.

In step 118, the current DHCP server 26 sends a DHCPLEASEUNASSIGNED message out in response to the DHCPLEASEQUERY message 40. The current DHCP server 26 does not wait the predefined amount of time.

In step 120, the current DHCP server 26 determines whether it is in charge of the particular IP network address 60 (i.e., whether the current DHCP server 26 was the last cooperating partner to interact with a DHCP client regarding the particular IP network address 60. Recall that the database entry 58, which corresponds to the particular IP network address 60, stores this control information for the particular IP network address 60 in the control field 90 (FIG. 3). If the current DHCP server 26 is in charge of the particular IP network address 60, the current DHCP server 26 proceeds to step 122. Otherwise, the current DHCP server 26 proceeds to step 124.

In step 122, the current DHCP server 26 sends a DHCPLEASEASSIGNED message out in response to the DHCPLEASEQUERY message 40. The current DHCP server 26 does not wait the predefined amount of time.

In step 124, the current DHCP server 26 waits the predefined amount of time (e.g., 500 milliseconds) and then sends a DHCPLEASEASSIGNED message out in response to the DHCPLEASEQUERY message 40. Accordingly, if the cooperating partner also provides a response message 42, the DHCP Relay Agent 28 will receive that response message 42 from the cooperating partner ahead of receiving the DHCPLEASEQUERY message 40 from the current DHCP server 26. As a result, the DHCP Relay Agent 28 will update its state information based on the answer from the DHCP server 26 which last exercised control over the lease regardless of the accuracy of the answer from the DHCP server 26 which did not last exercise control over the lease.

While various embodiments have been particularly shown and described, it will be understood by those skilled in the art that various changes in form and details may be made therein without departing from the spirit and scope of these embodiments as defined by the appended claims.

For example, it should be understood that each DHCP server 26 can be configured with a predefined default amount of time for the delay (e.g., 500 milliseconds). Here, the DHCP server 26 can be configured to change the predefined amount of time from the initial default value to a new value (e.g., 800 milliseconds, 1 second, and so on) in response to a user command (e.g., instructions from a network administrator). The new value is capable of being either higher or lower than the initial default value. Accordingly, the delay can be modified for added flexibility and to take into account nuances in the network (e.g., propagation delays due to irregular network topologies, traffic differences along different network paths, etc.).

Moreover, the delay feature can be disabled by a user command. Accordingly, the DHCP servers 26 are capable of being instructed to operate in a manner consistent with legacy systems. Such a feature could be useful if the DHCP Relay Agent 28 has the capability of identifying the correct response 42 upon receipt of multiple DHCP responses 42.

Furthermore, it should be understood that the system 20 was described above as having two DHCP servers 26 configured as a failover pair by way of example only. In other arrangements, there are more than two DHCP servers 26 configured to cooperate (e.g., three, four, etc.) in a cooperating set of DHCP servers 26. In such arrangements, only the DHCP server 26 which last interacted with the DHCP client 22 is configured to send out a DHCP leasequery response 42 without waiting. Each of the other DHCP servers 26 of the set will wait a predefined amount of time before sending out a DHCP leasequery response 42 if that other DHCP server 26 is communicating with the DHCP server 26 which last interacted with the DHCP client 22.

What is claimed is:

1. An apparatus, comprising:
   a network interface;
   memory; and
   a controller coupled to the network interface and the memory, the controller being configured to:
   receive, through the network interface, a query message from a relay agent following a loss, by the relay agent, of state information of one or more client devices disposed in electrical communication with the apparatus through the relay agent, the query message requesting data from the apparatus regarding a network resource, the apparatus configured as a Dynamic Host Configuration Protocol (DHCP) server, the network resource being a particular network address of the one or more client devices,
   access an identifier from the memory, the identifier indicating whether the apparatus was the last DHCP server of a set of DHCP servers to exercise control over the network resource, and
   when the identifier indicates that the apparatus was the last DHCP server of a set of DHCP servers to exercise control over the network resource, provide a response message to the relay agent through the network interface in response to the query message and regarding the network resource based on the identifier,
   when the identifier indicates that the apparatus was not the last DHCP server of a set of DHCP servers to exercise control over the network resource, delay generation of a response message for a predefined amount of time and generate and provide the response message to the relay agent through the network interface, in response to the query message and regarding the network resource, after lapse of the predefined amount of time, and wherein when delaying generation of a response message for a predefined amount of time and generating and providing the response message to the relay agent through the network interface, in response to the query message and regarding the network resource, after lapse of the predefined amount of time, the controller is configured to allow a DHCP server that last exercised control over the network resource of the one or more client devices to provide a response message to the relay agent.

2. An apparatus as in claim 1 wherein the apparatus is a first Dynamic Host Configuration Protocol (DHCP) server; wherein the first DHCP server and a second DHCP server are configured to operate as a DHCP cooperating pair configured to assign network addresses to DHCP clients; and wherein the controller, when receiving the query message from the relay agent, is configured to:
   obtain a DHCPLEASEQUERY message from the relay agent, the DHCPLEASEQUERY message being formatted in accordance with DHCP version 4 (DHCPv4) defined by the Internet Engineering Task Force (IETF).

3. An apparatus as in claim 2 wherein the relay agent is a cable modem termination system (CMTS) device; and wherein the controller, when obtaining the DHCPLEASEQUERY message, is configured to:
   acquire the DHCPLEASEQUERY message from a DHCP relay agent module running on the CMTS device.

4. An apparatus as in claim 2 wherein the controller, when providing the response message, is configured to:
   send, as the response message, one of a DHCPLEASEACTIVE message or a DHCPLEASEUNASSIGNED message to the relay agent in response to the DHCPLEASEQUERY message.

5. An apparatus as in claim 4 wherein the controller, when accessing the identifier, is configured to:
   read contents of a memory location of the memory, the memory location storing (i) a first value when the first DHCP server is the last server of the DHCP cooperating pair to exercise control over a lease for the particular network address, the first value indicating that the first DHCP server is in charge of the particular network address, and (ii) a second value when the first DHCP server is not the last server of the DHCP cooperating pair to exercise control over the lease for the particular network address, the second value indicating that the first DHCP server is not in charge of the particular network address, the first value being different than the second value.

6. An apparatus as in claim 4 wherein each DHCP server has a COMMUNICATION-UP state with the other DHCP server when that DHCP server is communicating with the other DHCP server, and a COMMUNICATION-DOWN state with the other DHCP server when that DHCP server has not heard from the other DHCP server in a predetermined time period; and wherein the controller, when sending the DHCPLEASEACTIVE message to the relay agent, is configured to:
   conclude that the second DHCP server is currently in the COMMUNICATION-UP state,
   purposefully wait the predefined amount of time, and
   after purposefully waiting the predefined amount of time, output the DHCPLEASEACTIVE message to the relay agent in response to the DHCPLEASEQUERY message.

7. An apparatus as in claim 6 wherein the controller is further configured to:
   conclude that communication with the second DHCP server is currently in the COMMUNICATION-DOWN state due to loss of communication with the second DHCP server;
   after concluding that communication with the second DHCP server is currently in the COMMUNICATION-DOWN state, receive another DHCPLEASEQUERY message; and
   immediately output another one of a DHCPLEASEACTIVE message or a DHCPLEASEINACTIVE message in response to the other DHCPLEASEQUERY message without purposefully waiting the predefined amount of time.

8. An apparatus as in claim 6 wherein the controller, when purposefully waiting the predefined amount of time, is configured to:
   prior to outputting the DHCPLEASEACTIVE message, allow substantially 500 milliseconds to expire in response to the first server concluding that communication with the second DHCP server is currently in the COMMUNICATION-UP state.

9. An apparatus as in claim 6 wherein the predefined amount of time is initially set to a default value and stored in the memory; and wherein the controller is further configured to:
   receive a user command, and
   change, in the memory, the predefined amount of time from the default value to a new value in response to the user command, the new value being different than the default value.

10. An apparatus as in claim 1 wherein the apparatus is a first Dynamic Host Configuration Protocol (DHCP) server;

wherein the first DHCP server and a second DHCP server are configured to operate as a DHCP cooperating pair configured to assign network addresses to DHCP clients; and wherein the identifier indicates which of the first DHCP server and the second DHCP server was the last DHCP server to exercise control over a particular network address lease identified by the response message to the relay agent in response to the query message from the network node.

11. In a first device of a set of devices, a method for responding to a query message, the method comprising:

receiving the query message from a relay agent following a loss, by the relay agent, of state information of one or more client devices disposed in electrical communication with the apparatus through the relay agent, the query message requesting data from the first device regarding a network resource, the first device configured as a Dynamic Host Configuration Protocol (DHCP) server, the network resource being a particular network address of the one or more client devices;

accessing an identifier which indicates whether the first device was the last DHCP server of a set of DHCP servers to exercise control over the network resource; and providing a response message to the network node in response to query message when the identifier indicates that the apparatus was the last DHCP server of a set of DHCP servers to exercise control over the network resource, providing a response message to the relay agent through the network interface in response to the query message and regarding the network resource based on the identifier, when the identifier indicates that the apparatus was not the last DHCP server of a set of DHCP servers to exercise control over the network resource, delaying generation of a response message for a predefined amount of time and generating and providing the response message to the relay agent through the network interface, in response to the query message and regarding the network resource, after lapse of the predefined amount of time, and wherein delaying generation of a response message for a predefined amount of time and generating and providing the response message to the relay agent through the network interface includes allowing a DHCP server that last exercised control over the network resource of the one or more client devices to provide a response message to the relay agent.

12. A method as in claim 11 wherein the first device is a first Dynamic Host Configuration Protocol (DHCP) server; wherein the set of devices further includes a second DHCP server; wherein the first and second DHCP servers are configured to operate as a DHCP cooperating pair configured to assign network addresses to DHCP clients, the network resource being a particular network address; and wherein receiving the query message from the relay agent includes:

obtaining a DHCPLEASEQUERY message from the relay agent, the DHCPLEASEQUERY message being formatted in accordance with DHCP version 4 (DHCPv4) defined by the Internet Engineering Task Force (IETF).

13. A method as in claim 12 wherein the relay agent is a cable modem termination system (CMTS) device; and wherein obtaining the DHCPLEASEQUERY message includes:

acquiring the DHCPLEASEQUERY message from a DHCP relay agent module running on the CMTS device.

14. A method as in claim 12 wherein providing the response message includes:

sending, as the response message, one of a DHCPLEASEACTIVE message or a DHCPLEASEUNASSIGNED message to the relay agent in response to the DHCPLEASEQUERY message.

15. A method as in claim 14 wherein accessing the identifier includes:

reading contents of a memory location, the memory location storing (i) a first value when the first DHCP server is the last server of the DHCP cooperating pair to exercise control over a lease for the particular network address, the first value indicating that the first DHCP server is in charge of the particular network address, and (ii) a second value when the first DHCP server is not the last server of the DHCP cooperating pair to exercise control over the lease for the particular network address, the second value indicating that the first DHCP server is not in charge of the particular network address, the first value being different than the second value.

16. A method as in claim 14 wherein each DHCP server has a COMMUNICATION-UP state with the other DHCP server when that DHCP server is communicating with the other DHCP server, and a COMMUNICATION-DOWN state with the other DHCP server when that DHCP server has not heard from the other DHCP server in a predetermined time period; and wherein sending the DHCPLEASEACTIVE message to the relay agent includes:

concluding that communication with the second DHCP server is currently in the COMMUNICATION-UP state, purposefully waiting the predefined amount of time, and after purposefully waiting the predefined amount of time, outputting the DHCPLEASEACTIVE message to the relay agent in response to the DHCPLEASEQUERY message.

17. A method as in claim 16, further comprising:

concluding that communication with the second DHCP server is currently in the COMMUNICATION-DOWN state due to loss of communication with the second DHCP server;

after concluding that communication with the second DHCP server is currently in the COMMUNICATION-DOWN state, receiving another DHCPLEASEQUERY message; and immediately outputting another one of a DHCPLEASEACTIVE message or a DHCPLEASEINACTIVE message in response to the other DHCPLEASEQUERY message without purposely waiting the predefined amount of time.

18. A method as in claim 16 wherein purposefully waiting the predefined amount of time includes:

prior to outputting the DHCPLEASEACTIVE message, allowing substantially 500 milliseconds to expire in response to the first server concluding that the second DHCP server is currently in the COMMUNICATION-UP state.

19. A method as in claim 16 wherein the predefined amount of time is initially set to a default value; and wherein the method further comprises:

receiving a user command, and changing the predefined amount of time from the default value to a new value in response to the user command, the new value being different than the default value.

* * * * *